April 18, 1967

J. C. OVERBAUGH 3,314,641

BUTTERFLY VALVE

Filed April 23, 1964

INVENTOR.
JOSEPH C. OVERBAUGH

BY

Head & Johnson
ATTORNEYS

INVENTOR.
JOSEPH C. OVERBAUGH

April 18, 1967    J. C. OVERBAUGH    3,314,641
BUTTERFLY VALVE

Filed April 23, 1964    3 Sheets-Sheet 3

INVENTOR.
JOSEPH C. OVERBAUGH
BY
Head & Johnson
ATTORNEYS

United States Patent Office 3,314,641
Patented Apr. 18, 1967

3,314,641
BUTTERFLY VALVE
Joseph C. Overbaugh, Houston, Tex., assignor to The Hale Company, Tulsa, Okla., a corporation of Ohio
Filed Apr. 23, 1964, Ser. No. 362,105
6 Claims. (Cl. 251—148)

This invention relates to a butterfly valve. More particularly, the invention relates to a butterfly valve having an improved resilient seat member. Still more particularly, the invention relates to an improved resilient seat member for butterfly valves having a rigid reinforcement therein, the improved seat being further characterized by provision of means whereby the seepage of fluid between the resilient seat member and the valve body is prevented.

Butterfly valves, their application, construction, and general principles are well known. Butterfly valves are superior in many applications to other types of valves due to the primary factors of economy of construction, simplicity, and dependability. A highly successful type of butterfly valve includes the arrangement wherein a metal disc member having a substantially 360 degree sealing periphery engages a resilient liner placed in the bore of the valve body. The combination of a metal disc and resilient liner provides a valve of relatively economical construction but one which is adaptable to close against relatively high pressure. Typically, the resilient member is of tubular construction so that it is slidably positionable within an axial bore in the valve body. Ordinarily the valve body is adaptable to receive flanges at each end which are held in place by bolts or so forth so that the resilient seat is firmly supported within the body. One difficulty which has characterized the metal disc-resilient seat butterfly valve is that fluid, particularly in pressure applications, tends to seep behind the resilient seat, that is, fluid seeps in between the contact area of the external circumference of the resilient seat and the internal circumference of the valve body. When a butterfly valve of this type is utilized to control the flow of corrosive fluids, such as salt water, this contact of the fluid with the valve body tends to corrode the body and makes removal of the resilient seat extremely difficult. In addition, in some cases, failure of valves have been experienced by channeling of fluid between the resilient seat and the valve body.

It is therefore an object of this invention to provide an improved resilient seat for a butterfly valve.

Another, and more specific object of this invention is to provide an improved seat for a butterfly valve including improved means of preventing the seepage of fluid between the resilient seat and the valve body.

Another particular object of this invention is to provide an improved butterfly valve including a reinforced resilient seat member, the configuration of the resilient seat member and the reinforcement cooperating to provide a seat which is slidably positionable within the axial bore in the valve body but which seals in a superior manner to prevent the flow of fluid between the resilient seat and the valve body.

These and other objects of the invention will be seen and a better understanding of the invention will be had by referring to the following description and claims, taken in conjunction with the attached drawings in which:

This invention may be described as an improved resilient seat for butterfly valves. More particularly, but not by way of limitation, the invention may be described as a resilient seat liner member for use with a butterfly valve having a body member and an axial bore therethrough, the improved liner comprising a tubular liner body member of resilient material, said liner having a tubular rigid reinforcing member encompassed by said liner body member, said reinforcing member defined in cross-section in a plane of the tubular axis by substantially parallel sides, said sides parallel to the tubular axis thereof, and tapered ends, said ends tapering convergingly towards the exterior of the outer circumferential periphery of the tubular reinforcing member.

Figure 1:
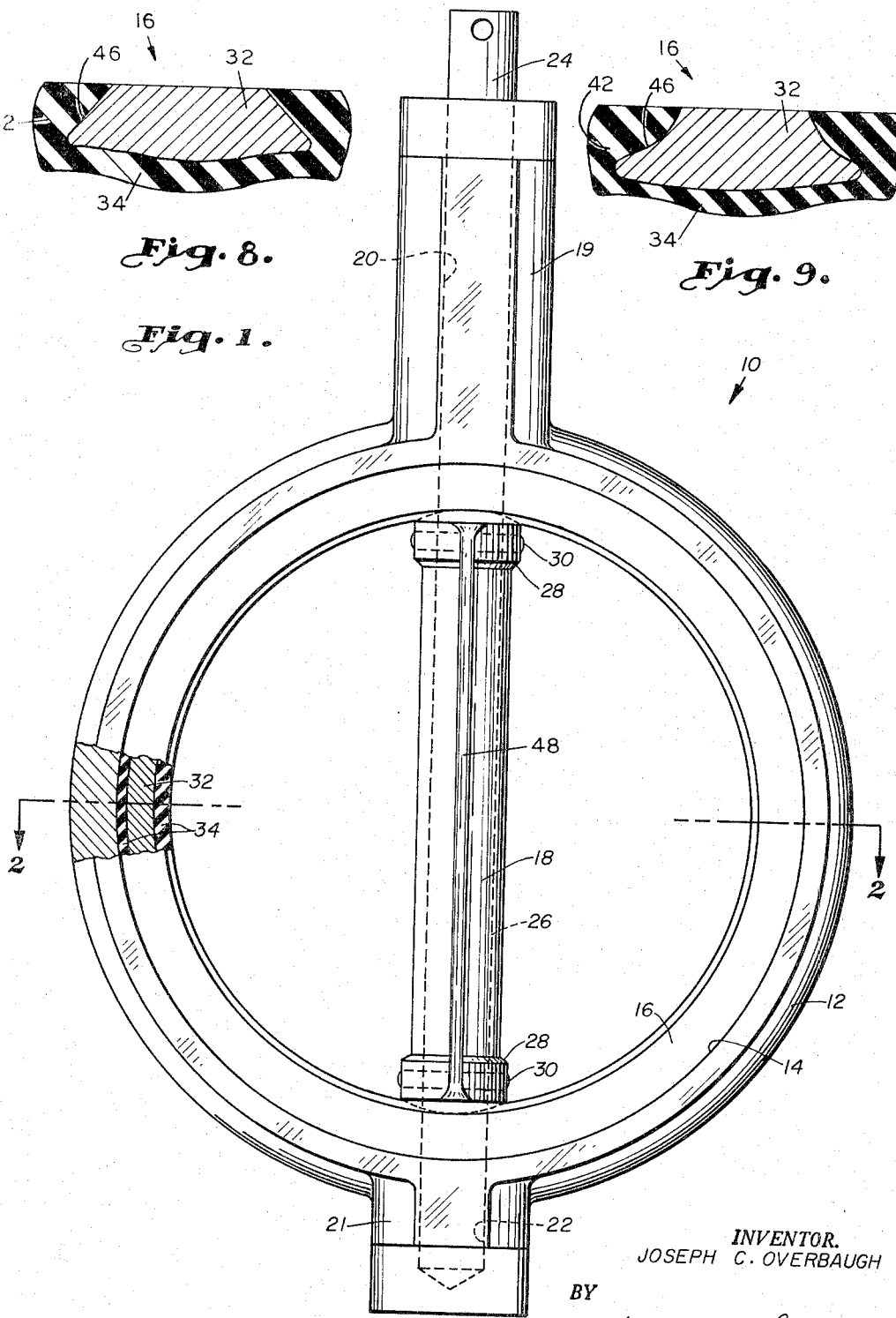
FIGURE 1 is an end view, shown partially in cross section, of a valve according to this invention showing the disc member rotated to full open position.

Referring now to the drawings and first to FIGURE 1, the numeral 10 indicates the valve of this invention shown in end view. The valve consists basically of a metallic body member 12 which has an axial bore 14 therethrough. Slidably positioned within the axial bore 14 is a tubular liner member 16. This invention is concerned primarily with the tubular liner member 16. Rotatably supported within the body 12 and liner 16 is a disc member 18 shown in full open or end view.

Body 12 is provided at the upper end with a stem guide 19 having an opening 20 therein. The lower end of body 12 is provided with a lower stem receiving boss 21 having an opening 22. A stem 24 extends through openings 20 and 22 and partially exteriorly of the valve at the upper end thereof. Stem 24 is received by an opening 26 in disc member 18. By means of a handle or other device (not shown), affixed to the exteriorly extending portion of stem 24, the disc member 18 may be rotated within the valve.

Disc member 18 is provided with an upper and lower enlarged flange portion 28. Keys 30 extend through the flange portions 28 and through stem 24 as a means of keying the rotation of the stem to the disc member. Although both upper and lower keys 30 are shown, only one of such keys is necessary to obtain locking relationship between the disc member and the stem.

The resilient seat 16 is shown partially in cross-section in FIGURE 1 which discloses the inclusion within the resilient seat of a rigid reinforcing member 32. Resilient seat 16 is composed of two elastic elements, that is the enclosed reinforcing member 32 and the encompassing resilient tubular liner body member 34.

Figure 2:
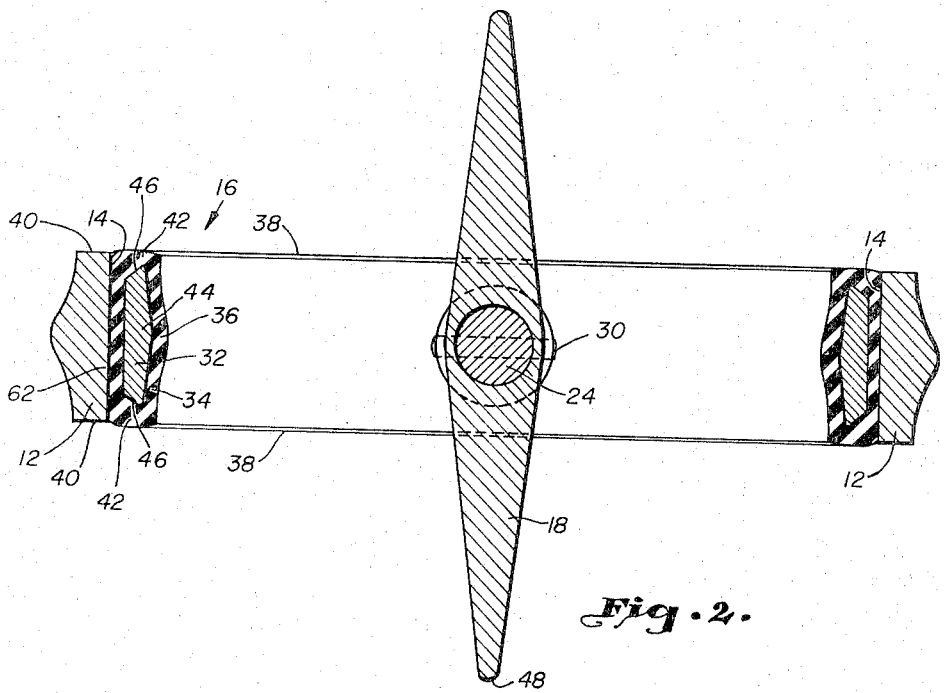
FIGURE 2 is a cross-sectional view taken along the lines 2—2 of FIGURE 1.

Referring to FIGURE 2, a cross-sectional view taken along the line 2—2 of FIGURE 1, more details of construction of the valve are shown. The valve depicted is the well known type adaptable to be utilized between flanges or other supporting members by means whereby the valve is affixed to piping or other fluid conducting devices. Valve body member 12, as previously mentioned, is provided with an axial bore 14. The disc member 18 (shown in full open position) is supported to the stem 24 by means of keys 30. As previously indicated, the tubular liner 16 is composed of the resilient liner body member 34 and the reinforcing member 32. The liner body member 32 may be described as a tubular member of resilient material. The tubular liner body member 34 is provided, in the preferred embodiment, with an integrally reduced internal diameter seating portion 36 intermediate the ends 38. The reduced internal diameter seating portion 36 provides clearance for the disc member 18 as it is rotated into and out of seating engagement.

The length of liner body member 34 (as measured parallel the tubular axis) is greater than the length of the tubular bore 14 in body member 12, that is, the ends 38 of the liner body member 14 extend beyond the parallel ends 40 of body 12. In the preferred embodiment the ends 38 are an integral arcuate increased length portion 42 intermediate the interior and exterior diameters of the liner body member 34. The function of the integral arcuate increased length portions 42 will be described subsequently.

The reinforcing member 32, which may be composed of any rigid material, such as hard rubber, plastic, metal or so forth, may generally be described as tubular in configuration. In the preferred embodiment however, the reinforcing member 32 has an interior periphery having an integral reduced internal diameter portion 44 which substantially conforms to and is spaced from the integral reduced internal diameter portion 36 of the liner body member 34.

A most important feature of this invention is the end configuration of the reinforcing member 32. Liner member 32 is defined in cross section by tapered ends 46 converging toward a point exteriorly of the outer periphery.

Figure 3:
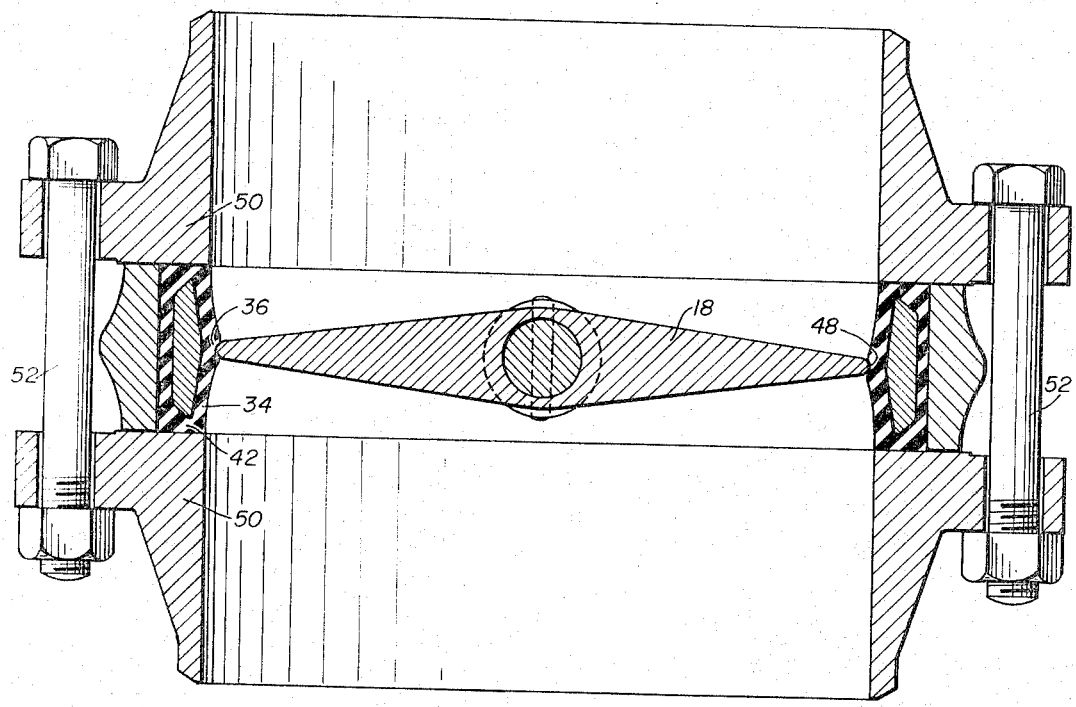
FIGURE 3 is a similar cross-sectional view as shown in FIGURE 1 except that the disc member is shown in closed position, and further, flange members are shown affixed to the valve as it appears in a typical installation.

FIGURE 3 shows the valve of this invention with the disc member 18 in closed position wherein the sealing periphery 48 is in sealable engagement with the reduced internal diameter seating portion 36 of the liner body member 34. In addition, FIGURE 3 discloses the valve member 34. In addition, FIGURE 3 discloses the valve placed in position intermediate two flanges 50, and held in such position by bolts 52. The arcuate increased length end portions 42 of resilient liner body member 34 have been compressed so that the total length of the tubular liner body member 34 in such compressed condition is the same as that of the axial bore 14 of body member 12. This accomplishes a unique achievement due to the configuration of the liner body member 34 and the reinforcing member 32 in a manner to be described subsequently.

Figure 5:
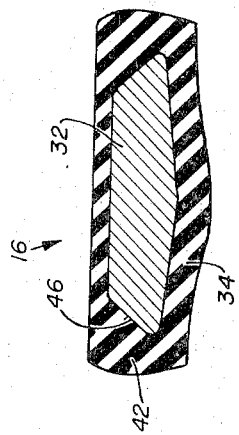
FIGURE 5 is a cross-sectional view of the resilient seat member of the invention taken along the lines 5—5 of FIGURE 4.
Figure 6:
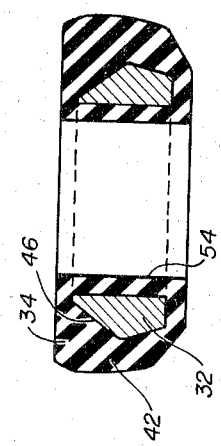
FIGURE 6 is a cross-sectional view of the resilient seat member taken along the lines 6—6 of FIGURE 4.
Figure 4:
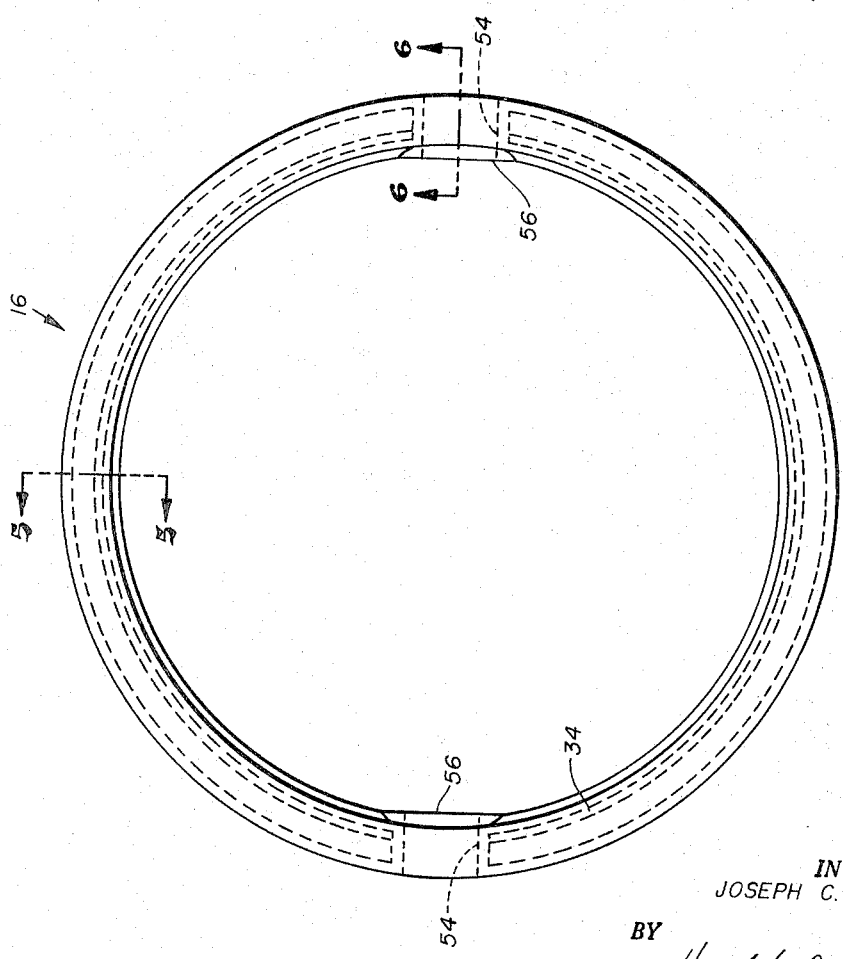
FIGURE 4 is an end view of the resilient seat member of the invention.

Referring to FIGURES 4, 5 and 6, the details of construction of the liner 16 are best shown. Liner 16 is tubular and is provided with openings 54 in opposite sides to receive the valve stem (not shown in FIGURE 4). In the area surrounding each of the openings 54 the liner is provided with flat areas 56 to compressibly receive the enlarged flange portions 28 (see FIGURE 1) of the disc 18. The compressive engagement of the flange portion 28 with the flat portions 56 of liner body member 34 prevent the escape of fluid along the stem. In addition, the slidable engagement of the flat surfaces 56 with the flange portions 28 of the disc 18 provide a bearing engagement of the disc with the liner 16.

FIGURE 5 is an enlarged cross-sectional view of the liner 16, and shows in greater detail the configuration of the tapered ends 46 of reinforcing member 32 and the integral arcuate increased length portions 42 of the liner body member 34. FIGURE 6 shows the cross-sectional appearance of the liners 16 in the area of openings 54.

Figure 7:
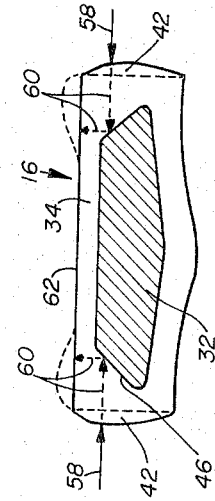
FIGURE 7 is a cross-sectional view of the resilient seat member as shown in FIGURE 5, showing diagrammatically the effect of the cooperative relationship of the resilient member and the enclosed rigid reinforcing member to provide improved sealing means.

Referring now to FIGURE 7, the unique arrangement of liner 16 of the invention is shown diagrammatically to illustrate how means is provided to prevent or at least diminish leakage of fluid between the resilient liner and the body of the valve. This invention utilizes three important characteristics of elastomers, that is, elastomers:

(1) are substantially non-compressible; (2) have memory; and (3) flow under pressure. In solid line in FIGURE 7 is shown the normal configuration of a cross-sectional portion of liner 16, and in dotted line is shown the configuration which the liner tends to take when force is applied against the ends thereof, as occurs when flanges 50, such as shown in FIGURE 3, are applied to the ends of the valves to adapt it for use in any typical installation. Arrows 58 represent the force applied by flanges pressing against the resilient seat 16. This force tends to deform the arcuate increased length portions 42 of the valve inwardly. This causes transverse flow within the resilient material as indicated by the dotted arrows 60. The resilient material contained in the area designated as 42 in the drawings is moved inwardly and by the effect by the tapered ends 46 of the reinforcing member 32, the force is transmitted in a direction towards the outer periphery 62 of the liner body member 34. The outer periphery 62 is, of course, in close proximity with the valve body axial bore 14 (see FIGURE 2) so that in reality the distortion of the outer periphery 62 is for the most part prevented from taking place by the valve body. The distortion however, does produce considerable sealing pressure of the liner body member 34 at each outer-peripheral end and around the total periphery thereof against the body of the valve. This sealing pressure prevents fluid seepage from passing between the exterior periphery 62 of the liner 16 and the valve body. At the same time, the sealing pressure causes a deformation of the resilient liner body member 34 to form, in effect, an O-ring seal between the flange 50 and valve body member 12.

When the flanges of the valves are removed, permitting the resilient liner body member 34 to return to its normal configuration, as shown in the solid lines of FIGURE 7, this sealing force caused by distortion of the resilient material is relieved and the liner 16 can be easily removed from the valve body. Thus the liner 16 can be easily slidably inserted into or removed from the valve body but effective sealing against fluid seepage is obtained when the valve flanges are applied. It can be seen that in its basic configuration liner 16 will function with the tapered ends 46 of reinforcing member 32 as long as the length of the tubular liner body body member 34 exceeds the length of the axial bore 14. The preferred embodiment however, is that this extra length be confined to an arcuate budge 42 and preferably wherein the arcuate bulge concentrates the maximum additional length in the area directly opposite the tapered end 46 of the reinforcing member 32.

Figure 8:
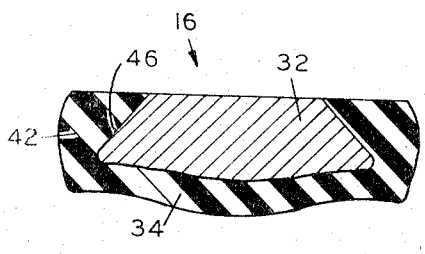
FIGURE 8 is a cross-sectional view of the resilient seat member as shown in FIGURE 5 but showing an alternate cross-sectional design of the reinforcing member.

FIGURE 8 discloses an alternate embodiment of the liner 16. In this embodiment the diameter of the reinforcing member 32 is the same as the liner itself. This embodiment is advantageous from a manufacturing standpoint that is, the reinforcing member 36 is readily positionable in a mold having the same internal diameter while the resilient liner body member 34 is cast around it.

Figure 9:
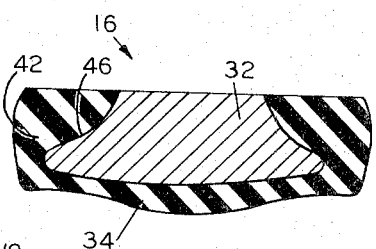
FIGURE 9 is a cross-sectional view of the resilient seat member as shown in FIGURE 5 but showing an additional alternate cross-sectional design of the reinforcing member.

FIGURE 9 discloses an additional embodiment, substantially as shown in FIGURE 8, but with the tapered ends 46 of arcuate configuration. This design accomplishes the same objectives as described with reference to the design of FIGURE 7, the arcuate tapered ends serving to deflect the flow of the resilient material toward the external circumference of the liner. The expression "tapered end" with reference to the reinforcing member 32 includes the configuration of FIGURE 9.

The tubular liner 16 has been described as being comprised of a rigid reinforcing member 32 "encompassed" by a resilient liner body member 34. This description includes the embodiments of FIGURES 8 and 9 as the resilient liner body member 34 encompasses the reinforcing member 32 in all areas subject to contact with fluid flowing through the valve.

An important advantage gained by the resilient seat design of this invention is that the provision of a reinforcing member 32 makes possible the use of relatively thin resilient liner body member 34 (see FIGURES 5, 8 and 9). Most elastomer material, such as natural or synthetic rubber, has a tendency to swell in the presence of certain liquids. The thinner material used in the design set forth herein means that proportionally less swelling occurs than if the entire liner 16 is made of the same material as the resilient portion 34.

The provision of liner 16 with a reinforcing member 32 substantially eliminates the possibility of the liner collapsing when the valve is subject to a vacuum or when the liner is subject to externally applied pressure. The reinforcing member acts to stabilize the liner external dimensions for improved effectiveness of the sealed contact of the liner with the periphery of disc 18 when the disc is in closed position. The arcuate integral reduced internal diameter seating portion 36 of the resilient liner body member 34 provides clearance with the periphery of disc 18 to minimize drag as the disc is rotated to opened and closed position.

This invention provides a butterfly valve of the highly successful metallic disc-resilient seat type including means wherein a resilient seat is easily positionable within the valve body and further including means wherein as flanges are applied to the valve during its installation for service, the resilient seat is distorted at each end outer periphery to cause firm engagement with the axial bore of the valve body and thereby lessening the chance of fluid seepage between the liner and the valve body.

Although the invention has been described with a certain degree of particularity, it is manifested that many changes may be made in the details of construction and the arrangement of components without departing from the spirit and scope of this disclosure.

What is claimed:
1. A butterfly valve for fitting between spaced apart flanges each having a flange face, said valve comprising:
 a body member having paralleled flange engaging ends and an axial bore therethrough perpendicular the ends;
 a tubular rigid reinforcing member defined in part by exteriorly converging tapered ends;
 a tubular resilient liner fully encompassing said reinforcing member, said liner member being positioned in said body member axial bore, the exterior circumferential surface thereof engaging the interior circumferential surface of said body member axial bore, said tubular liner providing an axial fluid passageway therethrough, said liner being of a length substantially equal to the length of said axial bore in said body and including a circumferential integral arcuate increased length flange engaging portion at each and aligned with and spaced from said tapered ends of said reinforcing member whereby as the ends of said resilient member are engaged by the flange faces the flange engaging portions thereof are deformed against the said tapered ends of the reinforcing member causing increased radial outward sealing contact pressure of the resilient liner against the interior circumferential surface of the axial bore of said body member;
 a disc member pivotally supported in said fluid passageway in said resilient liner, said disc in part defined by a peripheral liner engaging seating surface, said disc seating surface sealably engaging said resilient liner when the disc is in closed position; and
 means of pivoting said disc between open and closed position.

2. A valve according to claim 1 wherein said tubular rigid reinforcing member is defined in part by an integral circumferential reduced internal diameter portion intermediate the ends thereof and wherein said resilient liner includes an integral circumferential reduced internal diameter portion intermediate the ends thereof substantially conforming to and spaced from the reduced internal diameter portion of said reinforcing member, the said reduced internal diameter portion of said resilient member serving to engage the peripheral seating surface of said disc when said disc is in closed position.

3. A butterfly valve for fitting between spaced apart flanges, said valve comprising:
 a body member having paralleled flange engaging ends and an axial bore therethrough perpendicular the ends;
 a tubular rigid reinforcing member being defined in part by an integral circumferential reduced internal diameter portion intermediate the ends thereof;
 a tubular resilient liner fully encompassing said reinforcing member, said liner member being positioned in said body member axial bore, the exterior circumferential surface thereof engaging the interior circumferential surface of said body member axial bore, said tubular liner providing an axial fluid passageway therethrough, said liner being of a length of at least equal to the axial length of said bore in said body, said axial fluid passageway in said liner being defined in part by an integral circumferential reduced internal diameter portion intermediate the ends thereof substantially conforming to and spaced from the reduced internal diameter portion of said reinforcing member;
 a disc member pivotally supported in said fluid passageway in said resilient liner, said disc defined in part by a peripheral liner engaging seating surface, said disc seating surface engaging said reduced internal diameter portion of said resilient liner when said disc is in closed position; and
 means of pivoting said disc between open and closed position.

4. For use in a butterfly valve including a body member having paralleled spaced flange engaging ends and an axial bore therethrough perpendicular the ends, an improved liner comprising:
 a tubular rigid reinforcing member being defined in part by an integral circumferential reduced internal diameter portion intermediate the ends thereof;
 a tubular resilient liner fully encompassing said reinforcing member, said liner member being positioned in said body member axial bore, the exterior circumferential surface thereof engaging the interior circumferential surface of said body member axial bore, said tubular liner providing an axial fluid passageway therethrough, said liner being of a length at least equal to the axial length of said bore in said body, said axial fluid passageway in said liner being defined in part by an integral circumferential reduced internal diameter portion intermediate the ends thereof substantially conforming to and spaced from the reduced internal diameter portion of said reinforcing member.

5. For use in a butterfly valve including a body member having paralleled flange engaging ends and an axial bore therethrough perpendicular the ends, the body member being positioned between spaced apart flanges each having a flange face, an improved liner comprising:
 a tubular rigid reinforcing member being defined in part by exterior convergingly tapered ends;
 a tubular resilient liner fully encompassing said reinforcing member, said liner member being positioned in said body member axial bore, the exterior circumferential surface thereof engaging the interior circumferential surface of said body member axial bore, said tubular liner providing an axial fluid passageway therethrough, said liner being of a length substantially equal to the length of said axial bore in said body and including a circumferential integral arcuate increased length flange engaging portion at each end aligned with and spaced from said tapered ends of said reinforcing member whereby as the ends of said resilient member are engaged by flange faces the flange engaging portions thereof are deformed against the said tapered ends of the reinforcing member causing increased radial outward sealing contact pressure of the resilient liner against the interior circumferential surface of the axial bore of said body member.

6. An improved liner for a butterfly valve according to claim 5 wherein said tubular rigid reinforcing member is defined in part by an integral circumferential reduced internal diameter portion intermediate the ends thereof and wherein said resilient liner includes an integral circumferential reduced internal diameter portion intermediate the ends thereof substantially conforming to and spaced from the reduced internal diameter portion of said reinforcing member, the said reduced internal diameter portion of said resilient member serving to engage the peripheral seating surface of said disc when said disc is in closed position.

References Cited by the Examiner

UNITED STATES PATENTS

| 2,740,423 | 4/1956 | Stillwagon | 251—361 X |
| 3,100,500 | 8/1963 | Stillwagon | 251—317 X |
| 3,118,465 | 1/1964 | Scaramucci | 251—317 X |
| 3,173,650 | 3/1965 | Cotterman et al. | 251—306 |
| 3,233,861 | 2/1966 | Stillwagon | 251—306 |
| 3,241,806 | 3/1966 | Snell | 251—362 X |

FOREIGN PATENTS 680,536  2/1964  Canada.

M. CARY NELSON, *Primary Examiner.*

S. SCOTT, *Assistant Examiner.*